(12) United States Patent
Schwensen et al.

(10) Patent No.: US 12,467,431 B2
(45) Date of Patent: Nov. 11, 2025

(54) TORQUE LIMITER BASED ON CURRENT TORQUE VALUE

(71) Applicant: VESTAS WIND SYSTEMS A/S, Aarhus N (DK)

(72) Inventors: John Schwensen, Aarhus N (DK); Sara Siniscalchi Minna, Aarhus C (DK); Tobias Gybel Hovgaard, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/725,669

(22) PCT Filed: Dec. 22, 2022

(86) PCT No.: PCT/DK2022/050308
§ 371 (c)(1),
(2) Date: Jun. 28, 2024

(87) PCT Pub. No.: WO2023/126043
PCT Pub. Date: Jul. 6, 2023

(65) Prior Publication Data
US 2025/0163884 A1    May 22, 2025

(30) Foreign Application Priority Data
Dec. 29, 2021   (DK) .............................. PA202170675

(51) Int. Cl.
*F03D 7/02*    (2006.01)

(52) U.S. Cl.
CPC ...... *F03D 7/0224* (2013.01); *F05B 2270/327* (2013.01); *F05B 2270/335* (2013.01)

(58) Field of Classification Search
None
See application file for complete search history.

(56) References Cited

U.S. PATENT DOCUMENTS

| | | | |
|---|---|---|---|
| 9,863,400 B2 * | 1/2018 | Hardwicke, Jr. | ....... F03D 15/10 |
| 12,212,274 B2 * | 1/2025 | Lund | ......................... H02P 9/04 |

(Continued)

FOREIGN PATENT DOCUMENTS

| | | |
|---|---|---|
| CN | 104632523 A | 5/2015 |
| CN | 109973298 A | 7/2019 |

(Continued)

OTHER PUBLICATIONS

Yan (WO 2011127749 A1) + machine translation (Year: 2011).*

(Continued)

*Primary Examiner* — Juan G Flores
(74) *Attorney, Agent, or Firm* — Patterson + Sheridan, LLP; Gero G. McClellan (57) ABSTRACT

Techniques are provided for control of a wind turbine where a torque limit is set based on a control signal. A current torque value of a rotor of the wind turbine is determined and compared to an upper torque limit value and the control signal is modified if the current torque value is larger than the upper torque limit value. The upper torque limit value is based on a lower envelope signal which tracks the current torque value if the current torque value is lower than or equal to the previous lower envelope value and is set as a rising signal if the current torque value is higher than the previous lower envelope value. The upper torque limit is set to be a first amount higher than the lower envelope signal.

20 Claims, 4 Drawing Sheets

(56) References Cited

U.S. PATENT DOCUMENTS

| | | | |
|---|---|---|---|
| 2006/0273595 A1 | 12/2006 | Avagliano et al. | |
| 2015/0159625 A1* | 6/2015 | Hardwicke, Jr. | F03D 80/70 290/44 |
| 2019/0010923 A1 | 1/2019 | Dua et al. | |
| 2019/0058425 A1 | 2/2019 | De Rijcke et al. | |
| 2019/0072072 A1 | 3/2019 | Fang | |
| 2019/0368465 A1 | 12/2019 | Mandrioli et al. | |
| 2024/0014753 A1* | 1/2024 | Lund | H02P 9/00 |

FOREIGN PATENT DOCUMENTS

| | | | |
|---|---|---|---|
| CN | 113669201 A | | 11/2021 |
| EP | 3059444 A1 | * | 8/2016 |
| WO | 2011127749 A1 | | 10/2011 |
| WO | 2011157272 A2 | | 12/2011 |

OTHER PUBLICATIONS

Danish Patent and Trademark Office, 1st Technical Examination including The Search Report for Application PA 2021 70675 dated Jul. 20, 2022.

PCT International Search Report and Written Opinion of The International Searching Authority for Application PCT/DK2022/050308 dated Apr. 3, 2023 (Apr. 3, 2023).

* cited by examiner

TORQUE LIMITER BASED ON CURRENT TORQUE VALUE

FIELD OF THE INVENTION

The present invention relates to control of a wind turbine where a torque limit is set on a control signal.

BACKGROUND OF THE INVENTION

Modern wind turbines are controlled and regulated continuously with the purpose of extracting power from the wind under the current wind, and weather, while at the same time ensuring that the loads on the different components of the wind turbine are at any time kept within acceptable limits, and while respecting any externally set operational constraints. To accomplish this, a number of parameters are collected and monitored by the controllers in a wind turbine, such as, for instance, the current wind speed and direction, the rotational speed of the rotor, the pitch angle of each blade, the yaw angle, information on the grid system, and measured parameters (e.g. stresses or vibrations) from sensors placed e.g. on the blades, the nacelle, or on the tower.

Based on this and following some control strategy, control signals of the turbine are determined in order to perform in accordance with the given conditions and instructions.

Wind turbines are traditionally constructed and controlled according to standards and according to wind maps and incorporating the trade-off of maximizing the annual energy production by the wind turbine while on the same time ensuring a certain lifetime of the turbine i.e. keeping the loads on the different components of the wind turbine within acceptable limits at all times and over time.

Due to the varying nature of the wind, the drivetrain of a wind turbine is exposed to varying loads which lead to exposing the components of the drivetrain to fatigue and extreme loads. In general, the fatigue exposure may be handled by designing the turbine to withstand the expected load cycles over the lifetime of the wind turbine, and operational limits may be set to handle extreme loads.

It is against this background that the invention has been devised.

SUMMARY OF THE INVENTION

It would be advantageous to achieve an improved manner of handling load variations of a wind turbine, and in particular an improved manner of handling loads imposed by torque variations of the drivetrain.

Accordingly, in a first aspect, there is provided a method of controlling a wind turbine by the following steps;
   determine a control signal for controlling the wind turbine;
   determine a current torque value of a rotor of the wind turbine and compare the current torque value to an upper torque limit value, if the current torque value is larger than the upper torque limit value, modify the control signal so that a resulting torque value of the rotor is reduced, current torque values are included in a torque signal comprising previous torque values and the current torque value;
   wherein the upper torque limit value is based on a lower envelope signal comprising previous lower envelope values and a current lower envelope value, the lower envelope signal tracks the current torque value if the current torque value is lower than or equal to the previous lower envelope value and is set as a rising signal if the current torque value is higher than the previous lower envelope value, and wherein the upper torque limit is set to be a first amount higher than the lower envelope signal.

In this method the resulting torque limit is set dynamically in manner that follows the current torque value. Due to the varying nature of the wind, the torque of the rotor will vary significantly. Smaller variation cycles can typically be handled by proper design of the drivetrain and tuning of the controller, whereas larger variation cycles are typically less frequent and difficult to handle. Building a wind turbine which is capable of withstanding larger load cycles over the turbine lifetime may require large expensive components and conservative torque limits to constrain the operation of the wind turbine, this risk reducing the power production significantly.

By setting the upper torque limit value to follow an envelope signal that tracks the lower level of the current torque, a compromise can be set which on one hand limits the absolute level of the variation and thereby keeping peak loads down and the drivetrain within safe distance of extreme loads, but on the other hand allows for a larger upper torque limit as this upper torque limits follows the general trend of the torque signal. A larger upper torque limit ensures that the power production of the turbine is not reduced unnecessarily.

A further advantage is that the specific components of the drivetrain, e.g. gearbox and bearings, may not need to be designed conservatively for a specific wind turbine variant and design climate. The specific level the upper torque limit, i.e. the specific amount it is set higher than the lower envelope signal, provides room for using an over-dimensioned component with a lower level of the torque limit and an under-dimensioned component with a higher level of the torque limit, and thereby introducing a broader field of use of a given component in terms of wind turbine variants and design climate without violating fatigue limits and extreme load limits.

In an embodiment, in addition to setting an upper torque limit, a lower torque limit is also set. In this embodiment, the further steps are made:
   compare the current torque value to a lower torque limit value, if the current torque value is smaller than the lower torque limit value, modify the control signal so that a resulting torque value of the rotor is increased;
   wherein the lower torque limit value is based on an upper envelope signal comprising previous upper envelope values and a current upper envelope value, the upper envelope signal tracks the current torque value if the current torque value is higher than or equal to the previous upper envelope value and is set as a falling signal if the current torque value is smaller than the previous upper envelope value, and wherein the lower torque limit is set to be a second amount smaller than the lower envelope signal.

In this manner, the wind turbine is controlled so that the control signal is also modified if the current torque value is smaller than the lower torque limit value, resulting in that the torque variations are limited within a dynamic envelope band.

Operating a wind turbine with a torque limit that dynamically follows a limit band defined by previous torque values may be especially advantageous for a wind controller based on optimized control in view of constraints where both the upper and the lower torque limits can be set as constraints. Such controller may e.g. be a model predictive controller (MPC). For a classical feedback controller is may also be advantageous to impose a dynamic torque limit band, as it ensures that the torque variations are kept within limits in both upwards and downwards directions and thereby reduces variability in fatigue imposing load cycles.

The rising signal and/or the falling signal are preferable set as steady increasing or steady decreasing signals which follow a smooth trend. The signals are typically digital and discrete with a given sample frequency. A rising signal may be a signal where a current signal value is larger than former signal values, and a falling signal may be a signal where a current signal value is smaller than former signal values. The rising signal may be a smooth rising signal and/or the falling signal may be a smooth falling signal. A smooth rising signal and/or smooth falling signal may be obtained by applying a smoothing function to previous signal values.

In embodiments the first amount and/or the second amount is set based on a nominal torque value of the wind turbine. Generally, the first amount and/or the second amount is set to scale with the nominal torque in the range between 5% to 50% of the nominal torque, such as between 10% and 25% of the nominal torque. The general level of the first amount or second amount may be set to vary between wind turbine variants depending on the components of the specific turbine variant and depending on the design climate of the turbine variant. The actual value of the first and/or second amount will depend on the momentary torque, but the underlying calculation setup is normally determined in an offline process, e.g. a tuning or evaluation process. In embodiments where the first and/or second amount is based on offset(s) and/or gain(s), the size of the offset(s) and/or gain(s) may be determined offline in a tuning process. Generally, the first and/or second offset(s) is set to scale with the nominal torque in the range between 5% to 50% of the nominal torque, such as between 10% and 25% of the nominal torque. The gains may be set to be between 1 and 1.5, such as between 1.1 and 1.25. In embodiments a gain may be set to be below 1, if the gain in set in combination with an offset, so that the resulting torque limit is set higher than the torque signal.

According to a second aspect, the invention provides a controller for controlling a wind turbine; the controller comprises:
- a control unit arranged for determining a control signal for controlling the wind turbine;
- a torque limit unit arranged for determining a current torque value of a rotor of the wind turbine and compare the current torque value to an upper torque limit value, if the current torque value is larger than the upper torque limit value, to instruct the control unit to modify the control signal so that a resulting torque value of the rotor is reduced, current torque values are included in a torque signal comprising previous torque values and the current torque value;
- a torque evaluation unit arranged for determining a lower envelope signal comprising previous lower envelope values and a current lower envelope value, wherein the upper torque limit value is based on a lower envelope signal, the lower envelope signal tracks the current torque value if the current torque value is lower than or equal to the previous lower envelope value and is set as a rising signal if the current torque value is higher than the previous lower envelope value, and wherein the upper torque limit is set to be a first amount higher than the lower envelope signal.

The controller according to the second aspect of the invention is, thus, adapted to perform the method according to the first aspect of the invention, and the remarks set forth above are therefore equally applicable here.

Elements of the first and/or second aspect of the invention may comprise or be implemented using a computer program product being provided on a computer readable storage medium or being downloadable from a communication network. The computer program product comprises instructions to cause a data processing system, e.g. in the form of a controller, to carry out the instruction when loaded onto the data processing system. In general, a controller may be a unit or collection of functional units which comprises one or more processors, input/output interface(s) and a memory capable of storing instructions can be executed by a processor.

According to a third aspect the invention provides a wind turbine comprising a tower, a nacelle mounted rotatably on the tower, and one or more pitchable wind turbine blades mounted rotatably on the nacelle via a hub, and a controller according to the second aspect of the invention.

Thus, the wind turbine according to the third aspect may be controlled in accordance with a method according to the first aspect of the invention, and the remarks set forth above are therefore equally applicable here.

BRIEF DESCRIPTION OF THE DRAWINGS

Embodiments of the invention will be described, by way of example only, with reference to the drawings, in which.

DESCRIPTION OF EMBODIMENTS

Figure 1:
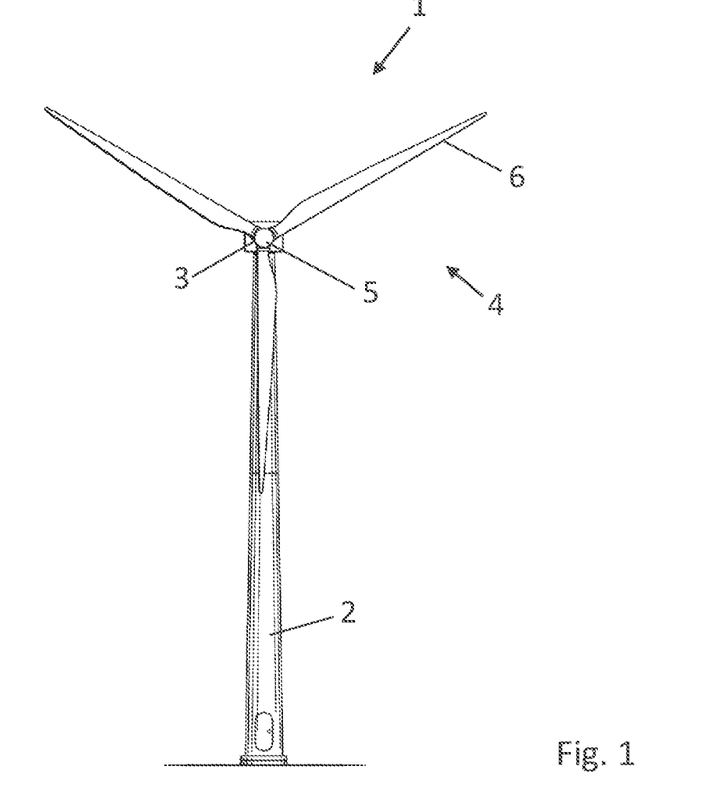
FIG. 1 illustrates, in a schematic view, an example of a wind turbine.

FIG. 1 illustrates, in a schematic view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle, in the tower or distributed at a number of locations inside (or externally to) the turbine and communicatively connected. The rotor blades are pitch-adjustable. The rotor blades can be adjusted in accordance with a collective pitch setting, where each of the blades are set to the same pitch value. In addition to that, the rotor blades are adjustable in accordance with individual pitch settings, where each blade may be provided with an individual pitch setpoint.

Figure 2:
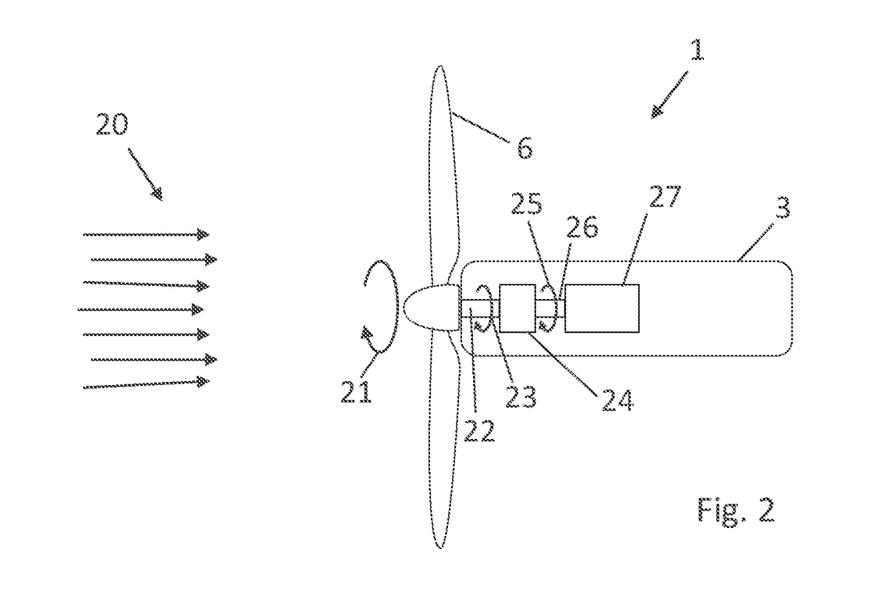
FIG. 2 is a diagram schematically illustrating an embodiment of a elements of a wind turbine as seen from the top.
Figure 5:
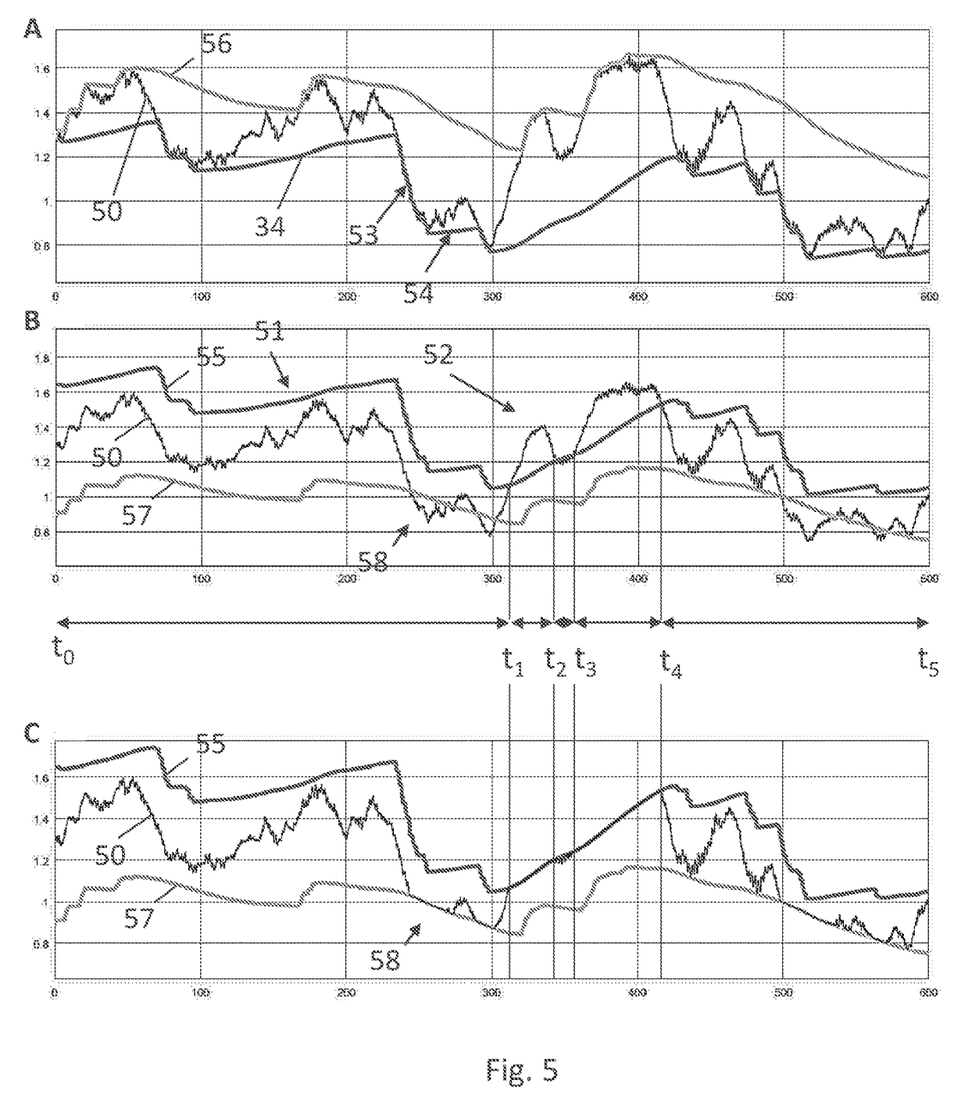
FIG. 5 illustrates an example of a torque signal in connection with envelope signals and torque limits.

FIG. 2 is a diagram schematically illustrating an embodiment of a elements of a wind turbine as seen from the top. When the wind field 20 hits the blades 6 of the wind turbine 1, the wind field imposes an aerodynamic torque 21 on the rotor which causes the electrical torque that drives the electrical generator 27. The aerodynamic torque will also impose a torque 23 on the low speed axis 22 entering into the gearbox 24, as well as a torque 25 on the high speed axis 26 entering into the generator 27. As the wind field 20, due to the nature of the wind, is continuously varying, the aerodynamic torque is also varying, and these variations are progressed through the drivetrain, here exemplified by the low speed axis, high speed axis, gearbox and generator. However further elements are also exposed to the torque variations, such as bearings and couplings. To handle these torque variations, the various components of the drive train is designed to withstand the expected resulting fatigue, and control measures are put in place to reduce any peak loads that are above a certain level. FIG. 5 illustrates a simulation example of a torque signal 50 experienced on the high speed axis. FIG. 5 is dealt with in more details below, for now two aspects of the torque variants are mentioned: periods of low level torque variations 51 and periods where the torque level jumps 52. The smaller, more high frequent cycles (variations) can typically be traced back to structural dynamics and interactions with the controller. These are generally found at well-known frequencies and show predictable behavior. The larger and more low frequent cycles (jumps) are on the other hand far less predictable as they can be mostly attributed directly to the wind conditions and turbulence.

Figure 3:
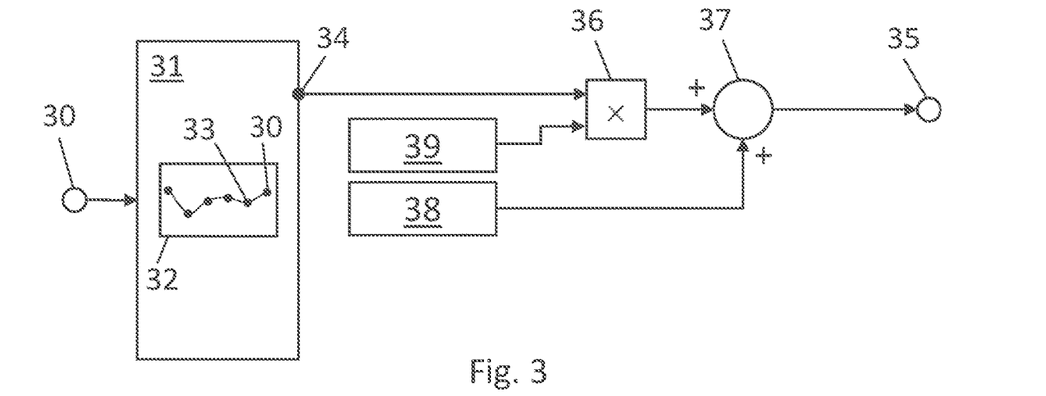
FIGS. 3 and 4 illustrate example control elements which can be arranged for implementing embodiments of the present invention.

FIG. 3 illustrates example control elements which can be arranged for implementing a control method in accordance with embodiments of the present invention.

Generally, the controller of the wind turbine is arranged for determining a control signal for controlling the wind turbine. Such control signal may be for a feedback controller, such as a PI or PID controller, but it may also be for other types of controller, such as a model-based controller, hereunder a model-predictive controller (MPC). The controller implemented in accordance with embodiments of the present invention is arranged for controlling a wind turbine in a manner so that torque variations are kept below a given limit, that is the controller is implemented as a torque limiter. This is generally obtained by determining a current torque value of a rotor of the wind turbine and compare the current torque value to an upper torque limit value. In the event the current torque value is larger than the upper torque limit value, the control signal is modified so that a resulting torque value of the rotor is reduced. The reduction of the resulting torque value may be implemented in different ways. Non-limiting examples include modifying the control signal by changing a rotor speed setpoint or changing a requested power setpoint or changing a pitch setpoint.

FIG. 3 illustrates a torque envelope unit 31 arranged for receiving current torque values 30. The current torque values are included in a torque signal 32 comprising previous torque values 33 and the current torque value 30. The torque signal may be stored by the torque envelope unit or otherwise accessed by the torque envelope unit from the general controller.

The torque envelope unit 31 is arranged for computing a lower envelope signal 34, the lower envelope signal comprising previous lower envelope values and a current lower envelope value. The lower envelope signal track the current torque value 30, that is set as the current torque value, if the current torque value is lower than or equal to the previous lower envelope value and is set as a rising signal if the current torque value is higher than the previous lower envelope value. A lower envelope signal 34 is shown in FIG. 5A. As can be seen, when current torque value is lower than or equal to the previous lower envelope value, i.e. the torque signal is a decreasing signal 53, the lower envelope signal tracks the current torque value. When the current torque value is higher than the previous lower envelope value, i.e. the torque signal is above the lower envelope signal 54, the lower envelope signal is a rising signal.

Returning to FIG. 3, an upper torque limit value 35 is set based on the lower envelope signal 34, so that the upper torque limit is set to be a first amount higher than the lower envelope signal. Embodiments of how the upper torque limit is set to be a first amount higher than the lower envelope signal is explained below in connection with the multiplication block 36 and the summation block 37.

The current torque 30, or momentary torque, may be determined in different ways. In one embodiment, the current torque is calculated from direct measurements. In an embodiment, the current torque value is based on a measurement of a generator speed, typically at the high speed axis 26 and an output power of the wind turbine. This provides a determination of the current torque as seen by the generator 27. The current torque may also be based on a direct torque measurement of the rotor axis by use of a torque sensor.

In alternative embodiments other torque determinations may be made. In one example, the current torque value is based on a torque estimator. Such torque estimator may be made in different ways and is typically based on a physics-based model of the wind turbine, such as an aeroelastic wind turbine model.

In principle the lower envelope signal may be constructed based on the current torque value and the immediate previous torque value. However, in an embodiment, the lower envelope signal may be constructed based on torque values observed in a recent time window. In an embodiment, the envelope signal is set as the low pass filtered value of a number of previous torque values. In this manner the envelope signal is constructed based on a comparison between the current torque value and a value set as the low pass filtered value of a number of previous torque values. In general other smoothing filters may be used instead of the low pass filter.

In an embodiment the envelop signal is implemented as an asymmetric filter where no filter action is applied if the current torque value is lower than or equal to the previous lower envelope value, and a filter action is applied if the current torque value is higher than the previous lower envelope value. By setting the filter as a low pass filter, a smooth rising function following the general trend of the torque signal is obtained directly.

Setting the upper torque limit a first amount higher than the lower envelope signal may be done is different ways. In one embodiment the upper torque limit is set by adding a first offset 38 to the lower envelope signal and/or multiplying the lower envelope signal with a first gain 39.

FIG. 5 illustrates the lower envelope, the upper torque limit and the resulting limiting effect on the torque signal. Additionally, FIG. 5 also deals with an upper envelope and a lower torque limit, these are dealt with below.

FIG. 5 illustrates a simulated torque signal 50 for a period of 600 seconds assuming standard climate variations, normal turbulence levels and normal wind turbine operation. In FIG. 5A, the lower envelope signal 34 is shown, and in FIG. 5B the resulting upper toque limit 55 is shown. As can be seen, the upper toque limit is a dynamic limit which follows the trend of the torque signal, allowing for low level torque variations 51 without affecting the control signal, and a reaction to peak levels of torque where the signal jumps 52.

In the period from $t_0$ to $t_1$ the torque signal 50 is below the upper torque limit 55, and the control signal is not affected. At time $t_1$ the torque signal becomes higher than the torque limit and as a consequence the control signal is modified so that a resulting torque value of the rotor is reduced. In FIG. 5B, the torque signal is not reduced showing how the torque signal would look if the torque limit is not imposed. FIG. 5C illustrates the situation where the torque limit is imposed to the control signal such that in the periods between $t_1$ and $t_2$ and $t_3$ and $t_4$, the control signal is modified so that the resulting torque signal stays below the upper torque limit 55. In the illustrated embodiment, the control signal is modified by reducing the power setpoint resulting in a lower torque.

In the simulation shown in FIG. 5, the upper torque limit 55 is set by adding a first offset 38 of 10% of the nominal torque to the lower envelope, whereas a gain of 1.18 is used. The results in a relative fatigue reduction of approximately 10% at the cost of a relative power reduction of approximately 2%. The torque limit may be set in a tuning process to find a compromise between the obtained fatigue reduction in view of the resulting output power reduction.

Figure 4:
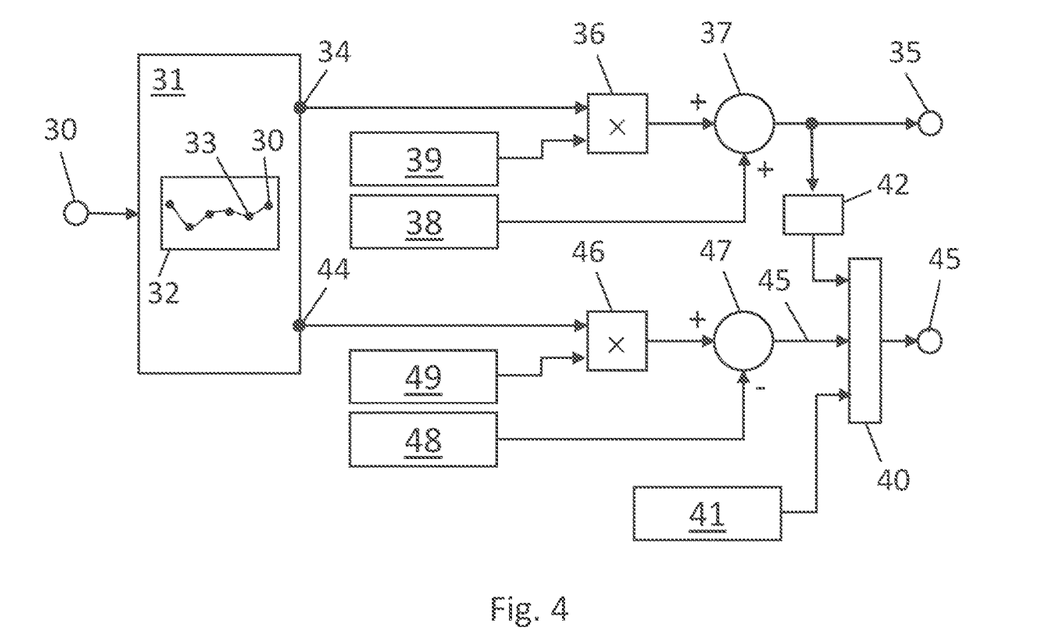

FIG. 4 illustrates example control elements which can be arranged for implementing a control method in accordance with a further embodiment of the present invention. In such further embodiment, in addition to setting an upper torque limit 35, a lower torque limit 45 is also set. In this manner, the wind turbine is controlled so that the control signal is also modified if the current torque value is smaller than the lower torque limit value, resulting in that the torque variations are limited within a dynamic envelope band.

In addition to the elements of FIG. 3, FIG. 4 illustrates that the envelope unit 31 is further implemented to generate an upper envelope 44 on which a lower torque limit 45 can be set to be a second amount smaller than the lower envelope signal.

In a corresponding manner to the lower envelope signal, the upper envelope signal track the current torque value if the current torque value is higher than or equal to the previous upper envelope value and is set as a falling signal if the current torque value is smaller than the previous upper envelope value.

Setting the lower torque limit a second amount lower than the upper envelope signal may be done is different ways. In one embodiment the lower torque limit is set by subtracting a second offset 48 to the lower envelope signal and/or multiplying the lower envelope signal with a second gain 49.

To ensure a given lower minimum torque value, e.g. to avoid torque backlash or low speed shutdown, the lower torque limit may be set as the minimum value 40 among the lower torque limit 45, a minimum allowed torque value 41 and/or the higher torque limit multiplied with a third gain 42. The minimum allowed torque value 41 may be calculated by multiplying the available power and a minimum allowed static speed. The third gain is typically smaller than 1 to ensure that the lower torque limit is smaller than the higher torque limit.

The second offset and second gain may be set in a corresponding manner as the first offset and first gain to obtain an appropriate second amount to set the lower torque limit. In an embodiment the second offset and the second gain are set equal or similar to the first offset and first gain with the modification that the second gain may be set as the inverse value to the first gain, or alternatively the multiplication block 46 may be implemented as a division block.

FIG. 5 further illustrates the upper envelope signal 56 which tracks the current torque value if the current torque value is higher than or equal to the previous upper envelope value and is set as a falling signal if the current torque value is smaller than the previous upper envelope value. Based on the upper envelope signal, the lower torque limit 57 is set to be a second amount smaller than the lower envelope signal.

In a corresponding manner as with the upper torque limit, the current torque value 50 is compared to the lower torque limit value 57, and if the current torque value is smaller than the lower torque limit value, the control signal is modified so that a resulting torque value of the rotor is increased. This can be seen in FIGS. 5B and 5C, e.g. as shown in region 58.

In embodiments, the upper torque limit and/or the lower torque limit may include a functional expression taking into account a current operational state of the wind turbine or an experienced operation over time of the wind turbine. In embodiments the current operational state may be such state as a start-up or shutdown state. The experienced operation over time may be the experienced or accumulated fatigue of the drivetrain.

Figure 6:
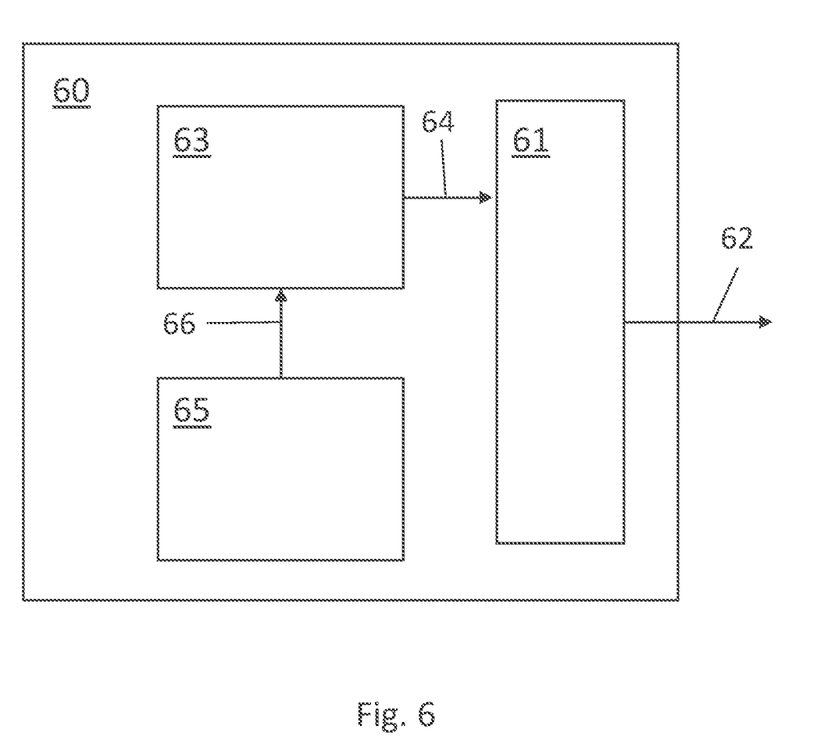
FIG. 6 schematically illustrates elements of a controller for controlling a wind turbine.

FIG. 6 schematically illustrates elements of a controller 60 for controlling a wind turbine 1. The controller comprises a control unit 61 arranged for determining a control signal 62 for controlling the wind turbine. The controller comprises a torque limit unit 63 arranged for determining a current torque value of a rotor of the wind turbine and to compare the current torque value to an upper torque limit value. In the event the current torque value is larger than the upper torque limit value, the torque limit unit 63 instructs 64 the control unit 61 to modify the control signal 62 so that a resulting torque value of the rotor is reduced. The controller further comprises a torque evaluation unit 65 arranged for determining the lower envelope signal 34 and set the upper torque limit 66 to be a first amount higher than the lower envelope signal.

The controller may implement further features hereunder aspects relating to the lower torque limit.

Example embodiments of the invention have been described for the purposes of illustration only, and not to limit the scope of the invention as defined in the accompanying claims.

The invention claimed is:

1. A method of controlling a wind turbine, comprising:
   determining a control signal for controlling the wind turbine;
   determining a current torque value of a rotor of the wind turbine and comparing the current torque value to an upper torque limit value, and when the current torque value is larger than the upper torque limit value, modifying the control signal so that a resulting torque value of the rotor is reduced, wherein the current torque value and previous torque values are included in a torque signal;
   wherein the upper torque limit value is based on a lower envelope signal comprising previous lower envelope values and a current lower envelope value, the lower envelope signal tracks the current torque value when the current torque value is lower than or equal to a previous lower envelope value of the previous lower envelope values and is set as a rising signal when the current torque value is higher than the previous lower envelope value, and wherein the upper torque limit value is set to be a first amount higher than the lower envelope signal; and
   controlling the wind turbine based on the control signal so that the resulting torque value of the rotor is changed.

2. The method according to claim 1, wherein the current torque value is based on a measurement of a generator speed and an output power or on a direct torque measurement of a rotor axis of the rotor.

3. The method according to claim 1, wherein the current torque value is based on a torque estimator.

4. The method according to claim 1 further comprising:
comparing the current torque value to a lower torque limit value, and when the current torque value is smaller than the lower torque limit value, modifying the control signal so that the resulting torque value of the rotor is increased,
wherein the lower torque limit value is based on an upper envelope signal comprising previous upper envelope values and a current upper envelope value, the upper envelope signal tracks the current torque value when the current torque value is higher than or equal to a previous upper envelope value of the previous upper envelope values and is set as a falling signal when the current torque value is smaller than the previous upper envelope value, and wherein the lower torque limit value is set to be a second amount smaller than the lower envelope signal.

5. The method according to claim 4, wherein the current lower envelope value or the current upper envelope value is set as a low pass filtered value of a number of the previous torque values.

6. The method according to claim 4, wherein the current upper envelope value is set as a filtered value of a number of the previous torque values, and wherein the falling signal is implemented as an asymmetric filter where no filter action is applied when the current torque value is higher than or equal to the previous upper envelope value, and a filter action is applied when the current torque value is smaller than the previous upper envelope value.

7. The method according to claim 4 wherein the first amount and/or the second amount is set based on a nominal torque value of the wind turbine.

8. The method according to claim 4 wherein the upper torque limit value is set by adding a first offset to the lower envelope signal and/or multiplying the lower envelope signal with a first gain, and/or wherein the lower torque limit value is set by subtracting a second offset to the upper envelope signal and/or multiplying the upper envelope signal with a second gain.

9. The method according to claim 4 wherein the upper torque limit value and/or the lower torque limit value include a functional expression taking into account a current operational state of the wind turbine or an experienced operation over time of the wind turbine.

10. The method according to claim 4 wherein the lower torque limit value is set as a minimum value of the lower torque limit value, a minimum allowed torque value and/or the upper torque limit value multiplied with a third gain.

11. The method according to claim 1, wherein the current lower envelope value is set as a filtered value of a number of the previous torque values, and wherein the rising signal is implemented as an asymmetric filter where no filter action is applied when the current torque value is lower than or equal to a previous lower envelope value, and a filter action is applied when the current torque value is higher than the previous lower envelope value.

12. The method according to claim 1 wherein the control signal is modified by changing a rotor speed setpoint or changing a requested power setpoint or changing a pitch setpoint.

13. A controller for controlling a wind turbine, the controller comprising:
a control unit arranged for determining a control signal for controlling the wind turbine;
a torque limit unit arranged for determining a current torque value of a rotor of the wind turbine and compare the current torque value to an upper torque limit value, when the current torque value is larger than the upper torque limit value, to instruct the control unit to modify the control signal so that a resulting torque value of the rotor is reduced, wherein the current torque value and previous torque values are included in a torque signal;
a torque evaluation unit arranged for determining a lower envelope signal comprising previous lower envelope values and a current lower envelope value, wherein the upper torque limit value is based on the lower envelope signal, the lower envelope signal tracks the current torque value when the current torque value is lower than or equal to a previous lower envelope value of the previous lower envelope values and is set as a rising signal when the current torque value is higher than the previous lower envelope value, and wherein the upper torque limit value is set to be a first amount higher than the lower envelope signal; and
wherein the controller is configured to control the wind turbine based on the control signal so that the resulting torque value of the rotor is changed.

14. The controller according to claim 13, wherein the current torque value is based on a measurement of a generator speed and an output power or on a direct torque measurement of a rotor axis of the rotor.

15. The controller according to claim 13, wherein the current torque value is based on a torque estimator.

16. The controller according to claim 13, wherein the current lower envelope value or a current upper envelope value is set as a low pass filtered value of a number of the previous torque values.

17. A wind turbine, comprising:
a tower;
a nacelle mounted rotatably on the tower;
one or more pitchable wind turbine blades mounted rotatably on the nacelle via a hub; and
a controller, comprising:
a control unit arranged for determining a control signal for controlling the wind turbine;
a torque limit unit arranged for determining a current torque value of a rotor of the wind turbine and compare the current torque value to an upper torque limit value, and when the current torque value is larger than the upper torque limit value, to instruct the control unit to modify the control signal so that a resulting torque value of the rotor is reduced, wherein the current torque value and previous torque values are included in a torque signal;
a torque evaluation unit arranged for determining a lower envelope signal comprising previous lower envelope values and a current lower envelope value, wherein the upper torque limit value is based on the lower envelope signal, the lower envelope signal tracks the current torque value when the current torque value is lower than or equal to a previous lower envelope value of the previous lower envelope values and is set as a rising signal when the current torque value is higher than the previous lower envelope value, and wherein the upper torque limit value is set to be a first amount higher than the lower envelope signal; and wherein the controller is configured to control the wind turbine based on the control signal so that the resulting torque value of the rotor is changed.

18. The wind turbine according to claim 17, wherein the current torque value is based on a measurement of a generator speed and an output power or on a direct torque measurement of a rotor axis of the rotor.

19. The wind turbine according to claim 17, wherein the current torque value is based on a torque estimator.

20. The wind turbine according to claim 17, wherein the current lower envelope value or a current upper envelope value is set as a low pass filtered value of a number of the previous torque values.

* * * * *